(12) United States Patent
Easey et al.

(10) Patent No.: US 10,352,745 B2
(45) Date of Patent: Jul. 16, 2019

(54) METHODS AND APPARATUS FOR DETERMINATION OF FLOW THROUGH A FLUID CONDUIT BASED ON A MEASURED CONVERGENCE OF FLUID CONDUIT TEMPERATURE AND AMBIENT TEMPERATURE

(71) Applicant: CENTRICA HIVE LIMITED, Windsor, Berkshire (GB)

(72) Inventors: Peter Easey, Ely (GB); David Griffin, St Ives (GB)

(73) Assignee: Centrica Hive Limited, Windsor, Berkshire (GB)

( * ) Notice: Subject to any disclaimer, the term of this patent is extended or adjusted under 35 U.S.C. 154(b) by 0 days.

(21) Appl. No.: 15/011,860

(22) Filed: Feb. 1, 2016

(65) Prior Publication Data
US 2016/0265955 A1    Sep. 15, 2016

(30) Foreign Application Priority Data

Mar. 13, 2015  (GB) .................................. 1504334.2
Oct. 7, 2015   (GB) .................................. 1517740.5
Jan. 29, 2016  (EP) .................................. 16153334

(51) Int. Cl.
*G01F 1/684*     (2006.01)
*G01F 15/14*     (2006.01)
(Continued)

(52) U.S. Cl.
CPC ............ *G01F 1/6847* (2013.01); *E03B 7/071* (2013.01); *F17D 5/02* (2013.01); *G01F 1/68* (2013.01);
(Continued)

(58) Field of Classification Search
CPC ........ G01F 1/684; G01F 1/6847; G01F 15/14; G01F 15/18; G01F 15/185; G01F 1/6888; G01F 1/69; G01F 1/692
See application file for complete search history.

(56) References Cited

U.S. PATENT DOCUMENTS

| | | | |
|---|---|---|---|
| 4,308,746 A | 1/1982 | Covington | |
| 4,336,708 A | 6/1982 | Hobgood et al. | |

(Continued)

FOREIGN PATENT DOCUMENTS

| | | |
|---|---|---|
| CA | 2763665 A1 | 11/1998 |
| DE | 3827444 A1 | 2/1990 |

(Continued)

OTHER PUBLICATIONS

Semitec Limited, "STS1 Pipe-Clip Temperature Sensors," ATC Semitec Ltd. Daisy Bank Lane, Anderton, Northwich Cheshire UK. Sep. 27, 2010.

*Primary Examiner* — Justin N Olamit
(74) *Attorney, Agent, or Firm* — The Noblitt Group, PLLC

(57) ABSTRACT

An apparatus for making a flow determination with respect to a flow through a fluid conduit such as a domestic water pipe, the fluid conduit comprising a wall having an inner surface surrounding a flow space through which the fluid flows and an outer surface, the apparatus comprising: a first temperature sensor arranged to be mounted on the outer surface of the fluid conduit and arranged to generate a first temperature signal indicative of a first temperature being the temperature of the outer surface; a second temperature sensor arranged to be positioned spaced apart from the first temperature sensor and to generate a second temperature signal indicative of a second temperature being the ambient temperature outside of the fluid conduit; and a processor having inputs for the first and second temperature signals; in (Continued)

which the processor has an output for the flow determination and is arranged to make the flow determination by determining a measure of the convergence of the first and second temperatures over time.

24 Claims, 10 Drawing Sheets

(51) Int. Cl.
*E03B 7/07* (2006.01)
*F17D 5/02* (2006.01)
*G01M 3/00* (2006.01)
*G01M 3/28* (2006.01)
*G01F 1/68* (2006.01)

(52) U.S. Cl.
CPC .............. *G01F 1/684* (2013.01); *G01F 15/14* (2013.01); *G01M 3/002* (2013.01); *G01M 3/2807* (2013.01); *Y02A 20/15* (2018.01)

(56) References Cited

U.S. PATENT DOCUMENTS

| | | | |
|---|---|---|---|
| 4,494,112 A | 1/1985 | Streib | |
| 4,495,488 A | 1/1985 | Streib | |
| 4,641,121 A * | 2/1987 | Boulanger | H01H 37/5427 |
| | | | 310/68 C |
| 5,064,604 A | 11/1991 | Barton | |
| 5,065,604 A | 11/1991 | Barton | |
| 5,343,737 A | 9/1994 | Baumoel | |
| 5,415,033 A | 5/1995 | Maresca, Jr. et al. | |
| 5,764,539 A | 6/1998 | Rani | |
| 5,918,268 A | 6/1999 | Lukas et al. | |
| 6,047,250 A | 4/2000 | Beaudoin et al. | |
| 6,779,919 B1 | 8/2004 | Staniforth et al. | |
| 6,883,369 B1 | 4/2005 | Myhre | |
| 8,286,481 B2 * | 10/2012 | Roehrig | G01F 1/662 |
| | | | 73/273 |
| 8,935,110 B2 | 1/2015 | Hsieh et al. | |
| 2003/0048190 A1 | 3/2003 | Landis et al. | |
| 2006/0225507 A1 | 10/2006 | Paulson | |
| 2006/0283236 A1 | 12/2006 | Trescott, Jr. et al. | |
| 2010/0206090 A1 * | 8/2010 | Stack | G01F 1/8477 |
| | | | 73/861.357 |
| 2010/0265096 A1 | 10/2010 | Cornwall et al. | |
| 2012/0180877 A1 | 7/2012 | Pallais | |
| 2012/0206272 A1 * | 8/2012 | Borlee | G01F 15/00 |
| | | | 340/870.02 |
| 2013/0106616 A1 | 5/2013 | Gustafsson et al. | |
| 2013/0174649 A1 | 7/2013 | Hains et al. | |
| 2013/0276549 A1 * | 10/2013 | Gaarder | G01F 1/7084 |
| | | | 73/861.95 |
| 2014/0034145 A1 | 2/2014 | Burt | |
| 2014/0306828 A1 | 10/2014 | Trescott et al. | |
| 2014/0348205 A1 * | 11/2014 | Shaw | G01M 3/002 |
| | | | 374/142 |
| 2016/0320245 A1 | 11/2016 | Hebron | |
| 2017/0102184 A1 * | 4/2017 | Hartl | F27D 19/00 |
| 2018/0010978 A1 * | 1/2018 | Bailey | G01M 3/002 |

FOREIGN PATENT DOCUMENTS

| | | |
|---|---|---|
| DE | 20201400330 U | 1/2014 |
| EP | 2840362 A1 | 2/2015 |
| FR | 2763665 A1 | 11/1998 |
| GB | 2475257 A | 5/2011 |
| GB | 2533936 A | 7/2016 |
| JP | 07-238578 * | 9/1995 |
| WO | 0125743 A2 | 4/2001 |
| WO | 2004025241 A1 | 3/2004 |
| WO | 2005047828 A1 | 5/2005 |
| WO | 2010114408 A1 | 10/2010 |
| WO | 2011107101 A1 | 9/2011 |
| WO | 2012097407 A1 | 7/2015 |
| WO | 2015097407 A1 | 7/2015 |
| WO | 2016110696 A1 | 7/2016 |

* cited by examiner

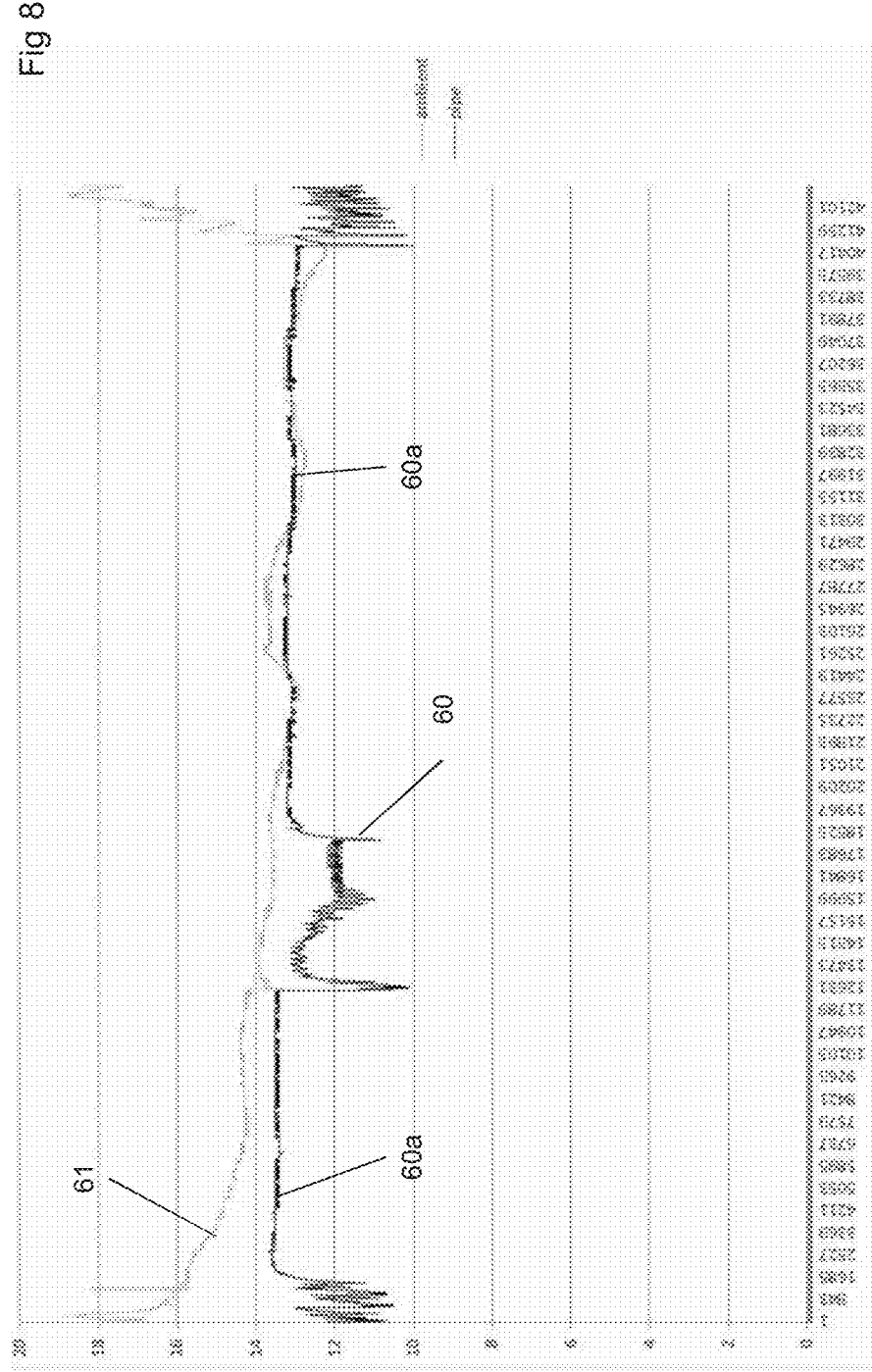

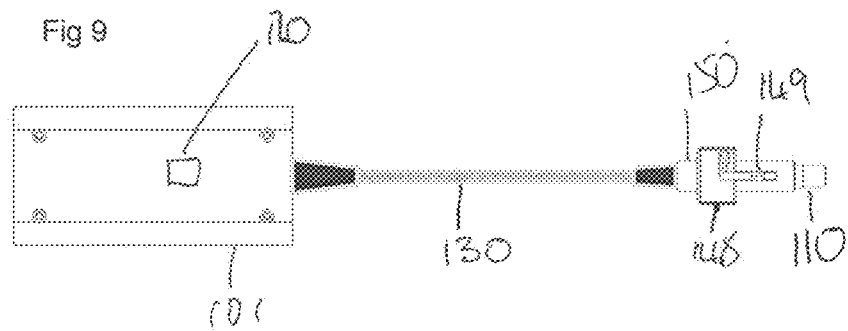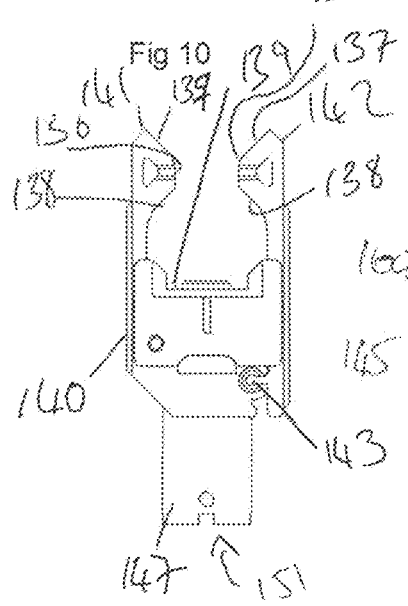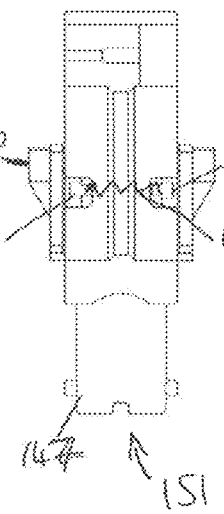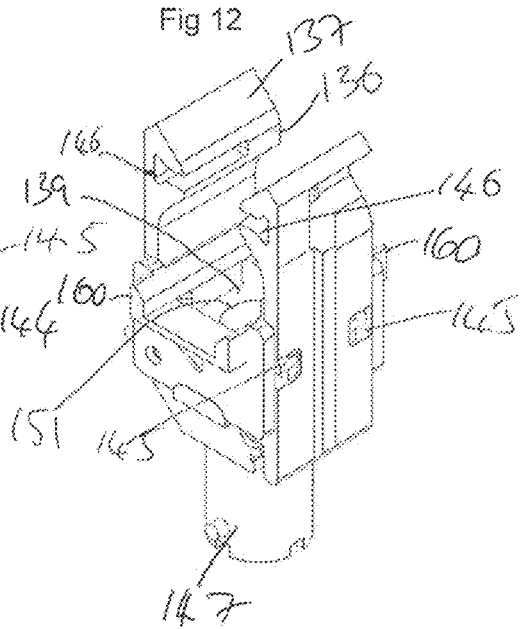

Fig 16
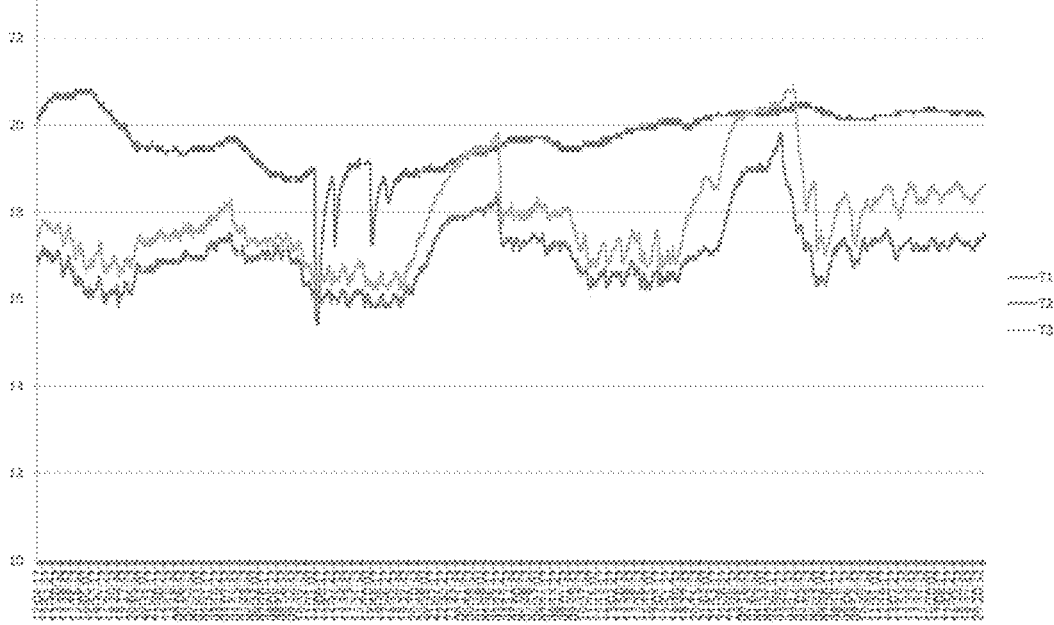
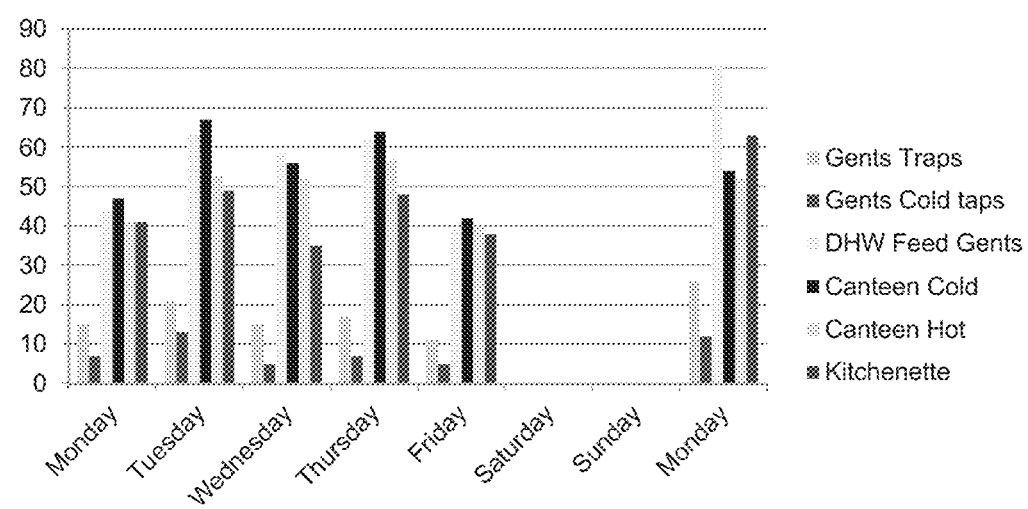
Fig 17

Fig 18
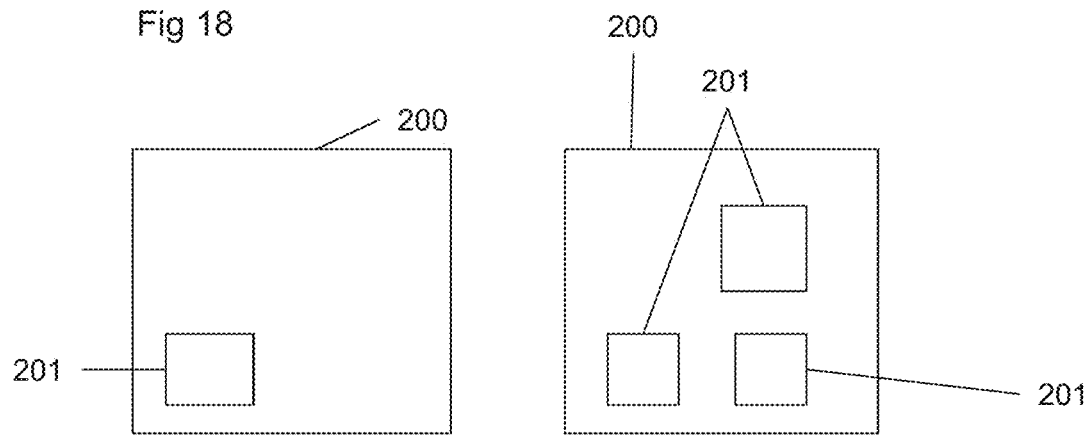
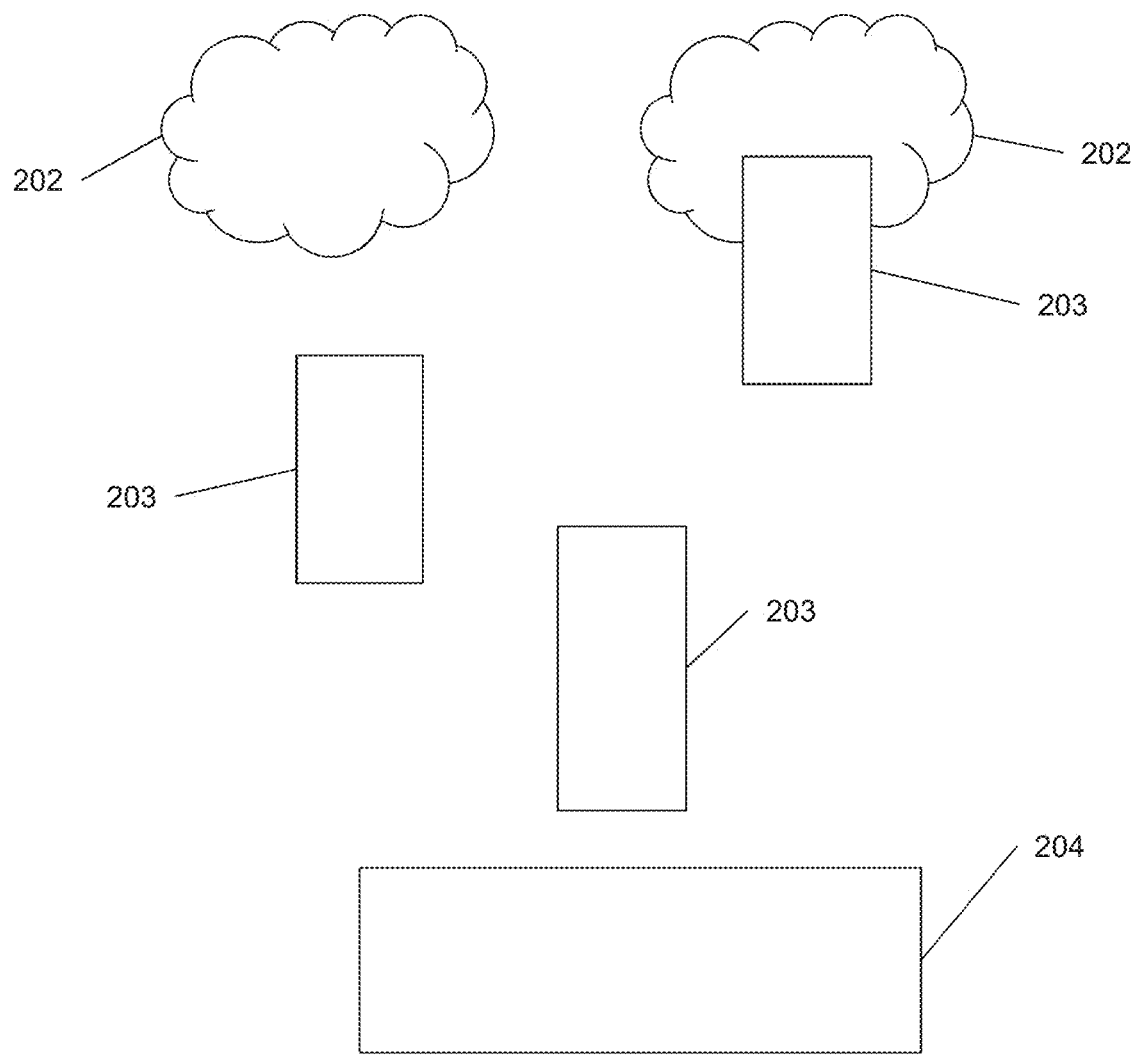

METHODS AND APPARATUS FOR DETERMINATION OF FLOW THROUGH A FLUID CONDUIT BASED ON A MEASURED CONVERGENCE OF FLUID CONDUIT TEMPERATURE AND AMBIENT TEMPERATURE

CROSS-REFERENCES TO RELATED APPLICATIONS

This application claims the priority benefit of the UK Patent Application GB1504334.2, filed on Mar. 13, 2015, 2013, and of the UK Patent Application GB1517740.5, filed on Oct. 7, 2015, 2013 and of the EP Patent Application EP16153334.4 filed on Jan. 29, 2016 and incorporates the disclosures of each application by reference.

This invention relates to a method and apparatus for flow determination, a fluid conduit provided with such an apparatus, a sensing apparatus and related kit of parts, and a data collection method.

For various reasons, in particular in order to prevent or mitigate against the damage caused by leaking pipes, it is desirable to be able to determine whether and to what extent a fluid, and typically water, is flowing through a fluid conduit such as a pipe. Given the extent of extant plumbing networks, it is desirable to provide a solution to this problem that is non-invasive, simple and easily installed.

We are aware of the PCT application published as WO01/25743, which discloses a flow sensor which determines whether there is flow through a pipe if the temperature of the pipe is different from ambient temperature by more than a predetermined limit for more than a predetermined period of time. However, this is relatively inflexible in that it requires the predetermined period of time to have elapsed before a determination is made, and no measurement of the level of flow is provided.

According to a first aspect of the invention, there is provided an apparatus for making a flow determination with respect to a flow through a fluid conduit, the fluid conduit comprising a wall having an inner surface surrounding a flow space through which the fluid flows and an outer surface, the apparatus comprising:
- a first temperature sensor arranged to be mounted on the outer surface of the fluid conduit and arranged to generate a first temperature signal indicative of a first temperature being the temperature of the outer surface;
- a second temperature sensor arranged to be positioned spaced apart from the first temperature sensor and to generate a second temperature signal indicative of a second temperature being the ambient temperature outside of the fluid conduit; and
- a processor having inputs for the first and second temperature signals;

in which the processor has an output for the flow determination and is arranged to make the flow determination by determining a measure of the convergence of the first and second temperatures over time.

As such, the convergence of the temperature of the fluid conduit and the ambient temperature can be used to make a flow determination. This can potentially be quicker and more reliable than simply determining that there is flow dependent upon the difference between the temperatures being more than a threshold.

The determination of the measure of convergence may comprise the comparison of a degree at which the first and second temperatures are converging with an expected degree, which may express the expected degree of convergence with no flow in the fluid conduit. Typically, the degree may be the rate of convergence or a value indicative thereof, or a second or higher derivative with respect to time of the convergence, or a value indicative thereof, or another value indicative of how quickly the first and second temperatures are converging. In another example, the degree may depend upon the standard deviation of the difference between the first and second temperatures.

However, in a preferred embodiment, the determination of the measure of convergence may comprise the comparison of the convergence with time of the first and second temperatures with an expected convergence curve. The expected convergence curve may express the expected convergence of the first and second temperatures with time with no flow in the fluid conduit.

As such, if the first and second temperatures are converging less quickly than expected by the expected convergence curve, the processor may cause the flow determination to indicate that the fluid is flowing in the conduit; if the first and second temperatures are converging as predicted by the expected convergence curve, typically within a tolerance, then processor may cause the flow determination to indicate that there is no flow. The processor may be arranged so that the flow determination indicates a greater flow the greater the divergence of the convergence of the first and second temperatures from the expected convergence curve.

The apparatus may comprise a memory holding the expected convergence curve. The memory may hold at least one expected convergence curve; where there is a plurality of expected convergence curves, they may relate to fluid conduits of different sizes and materials. Typically, each expected convergence curve may correspond to a model (typically theoretical and/or computational) which assumes no flow in the fluid conduit. The model may assume that the difference between the first and second temperatures will decay exponentially, or a numerical approximation to an exponential decay. Alternatively, the processor may be arranged to determine the expected convergence curve and typically to store it in the memory by recording the temperature of the fluid conduit over a period of time when there is known to be no flow, but that starts at a point where the temperature of the fluid conduit and the ambient temperature is different (for example, when there has been a recent flow).

The determination of the measure of convergence may comprise modelling the rate of change of the first temperature with time; as such, the rate of change of the first temperature may comprise a first component which is proportional to the difference between the first and second temperatures and has a first proportionality constant, and a second component which is proportional to the difference between the first temperature and a fluid temperature, being the temperature of a fluid in the fluid conduit, and has a second proportionality constant. The determination of the measure of convergence may then also comprise determining the first and second proportionality constants so that the modelled rate of change fits the measured first temperature.

The first proportionality constant may represent characteristics of the installation of the apparatus and so may be unlikely to vary; the second proportionality constant may vary depending on the level of flow through the conduit. The measure of convergence may be determined as the ratio of the first and second proportionality constants; the smaller the second proportionality constant is relative to the first proportionality constant, the lower the flow.

The fluid temperature may be determined as the lowest first temperature recorded, as that represents the fluid flowing through the pipe in a major flow event, such as intentional usage of the conduit. The lowest first temperature recorded may be taken over a discrete time window.

We have found that the above method gives good results even when actual convergence is not seen, and can give useful results more quickly. In particular, it is useful in cases where the first temperature converges to a temperature between the first second and fluid temperatures; this is indicative of a flow, but where the first and second components are equal.

The processor may be arranged so as to determine the flow determination including a determination of the presence of high frequency oscillations in the first temperature; typically, leaks, especially low flows where the escape manifests as drips, tend to be noisier than no-flow or desired-flow situations. Typically, high frequency will comprise frequencies significantly above a frequency corresponding to a time period characteristic of the convergence of the first and second temperature signals, typically above 0.1 Hz or 1 Hz.

The apparatus may comprise a third temperature sensor arranged to output a third temperature signal indicative of the first temperature but which is less responsive temporally than the first temperature sensor. As such, the processor may determine the presence of high frequency oscillations by comparing the first and third temperature signals.

The apparatus may comprise a housing in which the first and second temperature sensors are mounted. The housing may support the first temperature sensor against the fluid conduit. The housing may also support the second temperature sensor spaced away from the first temperature sensor.

The housing may comprise a thermal mass, such as a metallic body, which holds the first temperature sensor against the fluid conduit. The third temperature sensor may be provided on the thermal mass on an opposite face of the thermal mass to the first temperature sensor; this may provide the third temperature sensor's slower temporal response.

The housing may be provided with thermal insulation, such as an insulating foam, which separates the first temperature sensor (and the third temperature sensor) on the one hand from the second temperature sensor on the other hand. Typically, moving away from the fluid conduit, the housing may be arranged in the order first temperature sensor, thermal mass, (third temperature sensor if provided), thermal insulation, second temperature sensor.

The processor will typically be located spaced apart from the housing and/or the first and second temperature sensors, or may be located with the housing and/or the first and second temperature sensors, or may be distributed between different locations. As such, the apparatus may comprise a transmitting unit which is arranged to transmit the first and second (and third if present) temperature signals or the flow determination to a remote location, potentially containing the processor or a remote part thereof. The transmitting unit may, for example, be a Bluetooth® Low Energy transceiver, or any other suitable wireless transmitter. However, the transmitting unit may transmit the first and second temperature signals or the flow determination over wires, or the processor can be located with the first and second temperature sensors, possibly in the housing.

In the preferred embodiment of the invention, the processor or remote location comprises a mobile telecommunications device, such as a mobile telephone. As such, the functions of the processor may be carried out by an application of the mobile telecommunications device. Alternatively or additionally, the processor or remote location may comprise a hub, which is arranged to receive signals from multiple sets of first and second temperature sensors.

The apparatus may be provided with at least one auxiliary set of sensors each comprising:
- a first auxiliary temperature sensor arranged to be mounted on the outer surface of the fluid conduit at a different location to the first temperature sensor and arranged to generate a first auxiliary temperature signal indicative of a first auxiliary temperature being the temperature of the outer surface at the different location;
- a second auxiliary temperature sensor arranged to be positioned spaced apart from the first auxiliary temperature sensor and to generate a second auxiliary temperature signal indicative of a second auxiliary temperature being the ambient temperature outside of the fluid conduit at the different location;

in which the processor has inputs for each of the first and second auxiliary temperature sensors.

This is particularly useful where, as is standard in domestic plumbing installations, the fluid conduits in a particular installation branch out, and it is desired to determine in which branch there is a flow or leak.

The apparatus may comprise a temperature differential establishing device, arranged to be placed upstream of the first and second temperature sensors, or more preferably, an auxiliary set of sensors, and arranged to impart a temperature differential to the fluid flowing through the fluid conduit. This is useful significantly downstream of the entry of plumbing network into a dwelling as by then the temperature differential between the conduit and the fluid may decrease, making this method less accurate.

The temperature differential establishing device may heat or cool the fluid, typically by heating or cooling the fluid conduit respectively. As such, the temperature differential establishing device may comprise a heater (such as a resistive heater) or a cooler (such as a Peltier device) arranged for contact with the fluid conduit.

The flow determination may comprise a binary measure of whether the fluid is flowing. Alternatively, the flow determination may comprise an indication of a flow rate of the fluid in the fluid conduit.

Typically, the determination of the convergence of the first and second temperatures will be indicative of the flow at the first temperature sensor in a downstream direction through the fluid conduit. The processor may be additionally arranged to make a flow determination of a flow upstream (that is, in the opposite direction through the fluid conduit to downstream) of the first temperature sensor by determining the presence of a limit in the first temperature.

As such, we have appreciated that, if there is an upstream flow, the first temperature is unlikely to reach the second temperature, especially where as is common, a supply conduit is buried underground or otherwise embedded in a large thermal mass at a supply temperature. An upstream flow, at least in an upstream flow region immediately upstream of the first temperature sensor, is likely to mean that there is a temperature gradient within the conduit caused by the upstream flow. As such, a limit on the first temperature is to be distinguished from a lack of convergence; in determining whether there is a limit, the processor may be arranged so as to look at the absolute value of the first temperature rather than comparing the first and second temperatures as is done when assessing convergence.

The processor may be arranged to determine the presence of a limit in first temperature and so an upstream flow if the first temperature approaches, but does not cross, a temperature for a period of time. The period of time may be at least an hour. The upstream flow region may be at most 30 meters.

According to a second aspect of the invention, there is provided a fluid conduit comprising at least one fluid conduit fitted with the apparatus of the first aspect of the invention.

The plumbing network may comprise at least one branch fitted with at least one auxiliary set of sensors.

The fluid conduit may be a pipe; typically, the fluid will be a liquid such as water, although this invention can be used with any fluid flow. Typically, the plumbing network is a domestic clean water installation, although it may be used with commercial or industrial situations or for domestic (or otherwise) sewage installations.

According to a third aspect of the invention, there is provided a method of making a flow determination with respect to a flow through a fluid conduit, the fluid conduit comprising a wall having an inner surface surrounding a flow space through which the fluid flows and an outer surface, the method comprising:

measuring a first temperature being the temperature of the outer surface;

measuring a second temperature being the ambient temperature outside of the fluid conduit; and making the flow determination by determining a measure of the convergence of the first and second temperatures over time.

As such, the convergence of the temperature of the fluid conduit and the ambient temperature can be used to make a flow determination. This can potentially be quicker and more reliable than simply determining that there is flow dependent upon the difference between the temperatures being more than a threshold.

The determination of the measure of convergence may comprise the comparison of a degree at which the first and second temperatures are converging with an expected degree, which may express the expected degree of convergence with no flow in the fluid conduit. Typically, the degree may be the rate of convergence or a value indicative thereof, or a second or higher derivative with respect to time of the convergence, or a value indicative thereof, or another value indicative of how quickly the first and second temperatures are converging. In another example, the degree may depend upon the standard deviation of the difference between the first and second temperatures.

However, in a preferred embodiment, the determination of the measure of convergence may comprise the comparison of the convergence with time of the first and second temperatures with an expected convergence curve. The expected convergence curve may express the expected convergence of the first and second temperatures with time with no flow in the fluid conduit.

As such, if the first and second temperatures are converging less quickly than expected by the expected convergence curve, the flow determination may indicate that the fluid is flowing in the conduit; if the first and second temperatures are converging as predicted by the expected convergence curve, typically within a tolerance, then the flow determination may indicate that there is no flow. The flow determination may indicate a greater flow the greater the divergence of the convergence of the first and second temperatures from the expected convergence curve.

The method may comprise selecting the expected convergence curve from a plurality of expected convergence curves, which may relate to fluid conduits of different sizes and materials. Typically, each expected convergence curve may correspond to a model (typically theoretical and/or computational) which assumes no flow in the fluid conduit.

Alternatively, the method may comprise determining the expected convergence curve by recording the temperature of the fluid conduit over a period of time when there is known to be no flow, but which starts at a point where the temperature of the fluid conduit and the ambient temperature is different (for example, when there has been a recent flow).

The determination of the measure of convergence may comprise modelling the rate of change of the first temperature with time; as such, the rate of change of the first temperature may comprise a first component which is proportional to the difference between the first and second temperatures and has a first proportionality constant, and a second component which is proportional to the difference between the first temperature and a fluid temperature, being the temperature of a fluid in the fluid conduit, and has a second proportionality constant. The determination of the measure of convergence may then also comprise determining the first and second proportionality constants so that the modelled rate of change fits the measured first temperature.

The first proportionality constant may represent characteristics of the installation of the apparatus and so may be unlikely to vary; the second proportionality constant may vary depending on the level of flow through the conduit. The measure of convergence may be determined as the ratio of the first and second proportionality constants; the smaller the second proportionality constant is relative to the first proportionality constant, the lower the flow.

The third temperature may be determined as the lowest first temperature recorded, as that represents the fluid flowing through the pipe in a major flow event, such as intentional usage of the conduit. The lowest first temperature recorded may be taken over a discrete time window.

We have found that the above method gives good results even when actual convergence is not seen, and can give useful results more quickly. In particular, it is useful in cases where the first temperature converges to a temperature between the first second and third temperatures; this is indicative of a flow, but where the first and second components are equal.

The step of making the flow determination may include making a determination of the presence of high frequency oscillations in the first temperature; typically, leaks, especially low flows where the escape manifests as drips, tend to be noisier than no-flow or desired-flow situations. Typically, high frequency will comprise frequencies significantly above a frequency corresponding to a time period of the convergence of the first and second temperature signals, typically above 0.1 Hz or 1 Hz.

Where the first temperature is measured using a first temperature sensor, the method may comprise also measuring the first temperature using a further temperature sensor less responsive temporally than the first temperature sensor. As such, the method may comprise determining the presence of high frequency oscillations by comparing the first temperature as measured by the first and further temperature sensors.

The apparatus may comprise a housing in which the first and second temperature sensors are mounted. The housing may support the first temperature sensor against the fluid conduit. The housing may also support the second temperature sensor spaced away from the first temperature sensor.

The method may comprise taking auxiliary temperature measurements of the temperature of the fluid conduit and the local ambient temperature at at least one different location to the first temperature.

This is particularly useful where, as is standard in domestic plumbing installations, the fluid conduits in a particular installation branch out, and it is desired to determine in which branch there is a flow or leak.

The method may comprise establishing a temperature differential to the fluid flowing through the fluid conduit as compared to the local ambient temperature, upstream of at least one different location. This is useful significantly downstream of the entry of plumbing network into a dwelling as by then the temperature differential between the conduit and the fluid may decrease, making this method less accurate. The temperature differential may be hotter or colder.

The flow determination may comprise a binary measure of whether the fluid is flowing. Alternatively, the flow determination may comprise an indication of a flow rate of the fluid in the fluid conduit.

Typically, convergence of the first and second temperatures will be indicative of the flow at the first temperature sensor in a downstream direction through the fluid conduit. The method may comprise making a flow determination of a flow upstream (that is, in the opposite direction through the fluid conduit to downstream) of the first temperature sensor by determining the presence of a limit in the first temperature.

As such, we have appreciated that, if there is an upstream flow, the first temperature is unlikely to reach the second temperature, especially where as is common, a supply conduit is buried underground or otherwise embedded in a large thermal mass at a supply temperature. An upstream flow, at least in an upstream flow region immediately upstream of the first temperature sensor, is likely to mean that there is a temperature gradient within the conduit caused by the upstream flow. As such, a limit on the first temperature is to be distinguished from a lack of convergence; in determining whether there is a limit, the processor may be arranged to as to look at the absolute value of the first temperature rather than comparing the first and second temperatures as is done when assessing convergence.

The method may comprise the determination of the presence of a limit in the first temperature and so an upstream flow if the first temperature approaches, but does not cross, a temperature for a period of time. The period of time may be at least an hour. The upstream flow region may be at most 30 meters.

According to a fourth aspect of the invention, there is provided a sensing apparatus, comprising:
 a first temperature sensor;
 a sensor head housing the first temperature sensor, the sensor head being arranged so as to hold the first temperature sensor against a fluid conduit, with the first temperature sensor being arranged so as to produce in use a first temperature signal indicative of a first temperature being that of the fluid conduit;
 a housing;
 a second temperature sensor, arranged to produce in use a second temperature signal indicative of a second temperature being the ambient temperature;
in which the housing and the sensor head are joined by a flexible cable, the apparatus being arranged such that in use the flexible cable transmits at least one of the first and second temperature signals.

As such, this allows more convenient installation on a fluid conduit; only the sensor head need be attached to the fluid conduit, with a housing suspended on the flexible cable.

The second temperature sensor may be mounted in the housing. This allows the second temperature—the local ambient temperature—to be measured at a position more distant from the first temperature, and so less susceptible to interference.

Alternatively, the second temperature sensor can be in the sensor head with the first temperature sensor, but spaced therefrom. That can avoid any problems where there is material such as processing apparatus, batteries or the like which either create heat or are significant thermal masses, which could affect the second temperature sensor's measurement of ambient temperature.

Typically, the flexible cable will be at least 5 cm, 7 cm or 10 cm long, but not more than 12 cm, 15 cm or 20 cm long.

Typically, the apparatus will also comprise at least one of a processor, a battery and a transmitter for the first and/or second temperature signals in the housing. In such a case, and in the preferred embodiment, the apparatus will be arranged such that the flexible cable transmits the first temperature signal.

The sensor head may comprise a clamping mechanism arranged to clamp onto the fluid conduit. The clamping mechanism may comprise at least one jaw arranged to engage the fluid conduit. The clamping mechanism may comprise a biasing member arranged to bias each jaw into contact with the fluid conduit.

Each jaw may comprise a profiled section, which, when biased by the biasing member tends to drive a contact portion of the sensor head into contact with the fluid conduit. Typically, the profiled section will comprise a surface (typically planar) slanted relative to a biasing direction in which the biasing member applies a biasing force to the jaw, the surface facing the contact surface. Thus, the profiled section will act to ensure appropriate engagement of the sensor head with the fluid conduit.

Each jaw may further comprise a further profiled section, which is also slanted relative to the biasing direction, but in an opposing direction, so that application of the biasing force tends to drive the contact surface away from the fluid conduit. The further profiled section is typically spaced further from the contact portion than the profiled section. This arrangement has the effect that, if the sensor head is not pushed onto the fluid conduit sufficiently far to engage, it will be driven off the fluid conduit. This can give an installer confidence that, when the sensor head drives onto the fluid conduit—typically "snaps" on—that the sensor head is properly engaged, as if it were not properly engaged it would be driven off by the further profiled section.

The contact section may comprise a bridge piece that is wider in a direction perpendicular to the biasing direction than the remainder of the sensor head. This can act to reduce a moment applied to the fluid conduit due to the weight of the housing when suspected from the flexible cable.

The first temperature sensor may be provided with a sensor biasing member, which tends to bias the first temperature sensor into contact with the fluid conduit in use. The first temperature sensor may be mounted in the sensor head using a coupling which can be repeatedly released and engaged. This allows for a single first temperature sensor (a relatively high cost component) to be used with multiple different sensor heads (typically a lower cost component).

The sensing apparatus may also be an apparatus in accordance with the first aspect of the invention, with the first and second temperature sensors of the sensing apparatus being the first and second temperature sensors of the apparatus of the first aspect of the invention. Typically, the processor may be housed within the housing.

According to a fifth aspect of the invention, there is provided a kit of parts, comprising:

a first temperature sensor;
a plurality of sensor heads arranged to house the first temperature sensor, each sensor head being arranged so as to hold the first temperature sensor against a fluid conduit, with the first temperature sensor being arranged so as to produce in use a first temperature signal indicative of a first temperature being that of the fluid conduit;
a housing;
a second temperature sensor in the housing, arranged to produce in use a second temperature signal indicative of a second temperature being the ambient temperature around the housing;
in which the housing and the first temperature sensor are joined by a flexible cable, the apparatus being arranged such that in use the flexible cable transmits at least one of the first and second temperature signals and that the sensor heads can interchangeable engage the first temperature sensor.

Thus, this allows an installer to pick from several sensor heads relating to different pipes, using the same first temperature sensor.

The kit of parts may have any of the optional features of the fourth aspect of the invention.

According to a sixth aspect of the invention, there is provided a method of collecting data, comprising providing:
a plurality of data capture devices arranged to capture data and each comprising a transmitter;
a plurality of mobile telecommunication devices; and
a central server;
in which the method comprises transmitting the data from each data capture device to a mobile telecommunication device when the mobile data device is within a reception area of the data capture device, the mobile data reception device subsequently transmitting the data to the central server.

As such, any of the plurality of mobile telecommunication devices can pick up the data from any of the data capture devices. If, for example, the mobile telecommunications devices are mobile telephones provided with a suitable application to cause them to act in this way, then any user of the application within the reception area can lead to the data being collected and transmitted from the central server.

Each mobile telecommunications device may be associated with at least one data capture device and not associated with other of the data capture devices; typically, these may be those related to a particular user. The method may comprise the mobile telecommunications device receiving data from any data capture device and potentially transmitting that data to the central server (regardless of whether it is associated therewith), but not allowing access to the user of the mobile telecommunications device to data from a data capture device to which the mobile telecommunications device is not associated.

Thus, whilst data is still captured and transmitted to the central server even using a non-associated mobile telecommunications device (which may be of a different user serendipitously passing through the reception area), the user of the non-associated mobile telecommunications device will have no access to that data.

The method may comprise transmitting data transmitted from a data capture device from the central server to the mobile telecommunications device associated with that data capture device. The method may also comprise determining whether data received at a mobile telecommunications device is data from a data capture device associated with that mobile telecommunications device and only transmitting the data to the central server if it is not.

Typically, the data will be temperature data relating to the temperature of at least one fluid conduit and typically also the ambient temperature. Alternatively, the data could be a flow determination of flow of fluid through a conduit.

Each data capture device may be in accordance with the first and/or fourth aspects of the invention. The method may comprise collecting the data by carrying out the method of the second aspect of the invention.

According to a seventh aspect of the invention, there is provided a data collection apparatus, comprising:
a plurality of data capture devices arranged to capture data and each comprising a transmitter;
a plurality of mobile telecommunication devices; and
a central server;
in which each data capture device is arranged to transmit the captured data to a mobile telecommunication device when the mobile data device is within a reception area of the data capture device, and in which the mobile data reception device is arranged to transmit the data to the central server.

As such, any of the plurality of mobile telecommunication devices can pick up the data from any of the data capture devices. If, for example, the mobile telecommunications devices are mobile telephones provided with a suitable application to cause them to act in this way, then any user of the application within the reception area can lead to the data being collected and transmitted from the central server.

Each mobile telecommunications device may be associated with at least one data capture device and not associated with other of the data capture devices; typically, these may be those related to a particular user. The mobile telecommunications device may be arranged to receive data from any data capture device and potentially to transmit that data to the central server (regardless of whether it is associated therewith), but may be arranged to not allow access to the user of the mobile telecommunications device to data from a data capture device to which the mobile telecommunications device is not associated.

Thus, whilst data is still captured and transmitted to the central server even using a non-associated mobile telecommunications device (which may be of a different user serendipitously passing through the reception area), the user of the non-associated mobile telecommunications device will have no access to that data.

The central server may be arranged to transmit data transmitted from a data capture device to the mobile telecommunications device associated with that data capture device. At least one of each data capture device and each mobile telecommunications device may be arranged so as to determine whether data received at a mobile telecommunications device is data from a data capture device associated with that mobile telecommunications device and to only transmit the data to the central server if it is not.

Typically, the data will be temperature data relating to the temperature of at least one fluid conduit and typically also the ambient temperature. Alternatively, the data could be a flow determination of flow of fluid through a conduit.

Each data capture device may be in accordance with the first and/or fourth aspects of the invention. Each data capture device may be arranged so as to collect the data by carrying out the method of the second aspect of the invention.

There now follows, by way of example only, description of an embodiment of the invention, described with reference to the accompanying drawings in which:

FIG. 8 shows further data collected by the sensors of the flow determination apparatus of FIG. 1;

FIG. 9 shows a plan view of a sensing apparatus in accordance with an embodiment of the invention;

FIGS. 10 to 12 show front, side and perspective views respectively of a sensor head of the sensing apparatus of FIG. 9;

FIGS. 16 and 17 show further data collected by the sensors of the flow determination apparatus of FIG. 1; and FIG. 18 shows an embodiment of a data collection system in accordance with the present invention.

Figure 1:
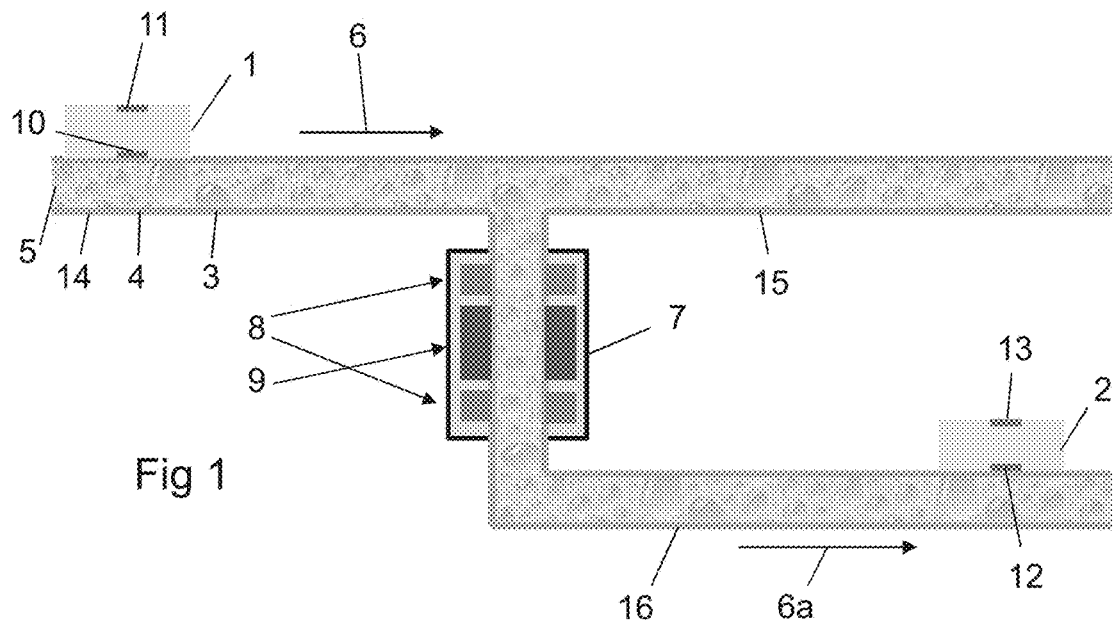
FIG. 1 shows a schematic view of a plumbing network having a flow determination apparatus in accordance with an embodiment of the invention.
Figure 2:
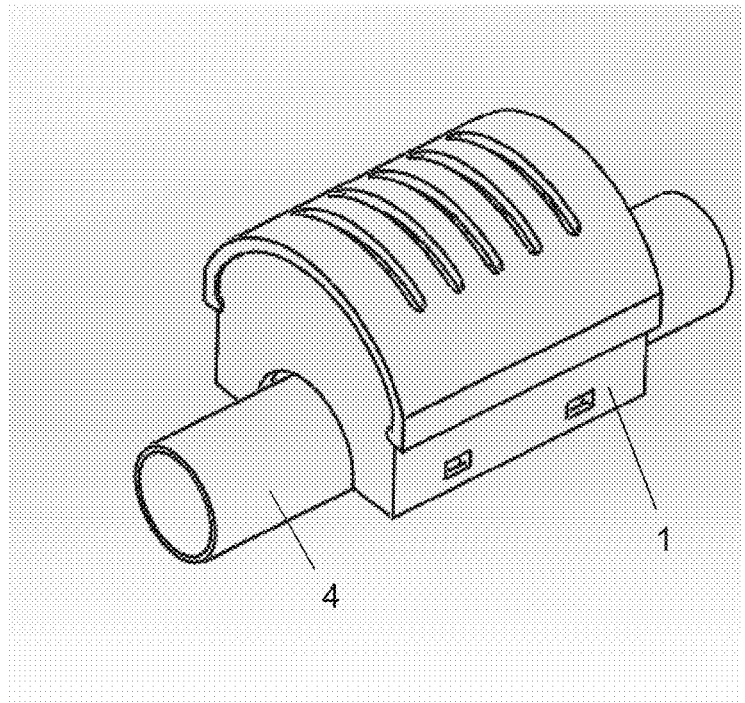
FIG. 2 shows a perspective view of the housing of the flow determination apparatus of FIG. 1.

A fresh water plumbing network for a domestic dwelling is shown schematically in FIG. 1 of the accompanying drawings. In this embodiment, a single supply pipe 14 enters the dwelling and branches into multiple branches 15, 16. Herein, we refer generically to the pipe 14, 15, 16 as 4, the pipe being a form of fluid conduit carrying clean water 5, a fluid.

Figure 4:
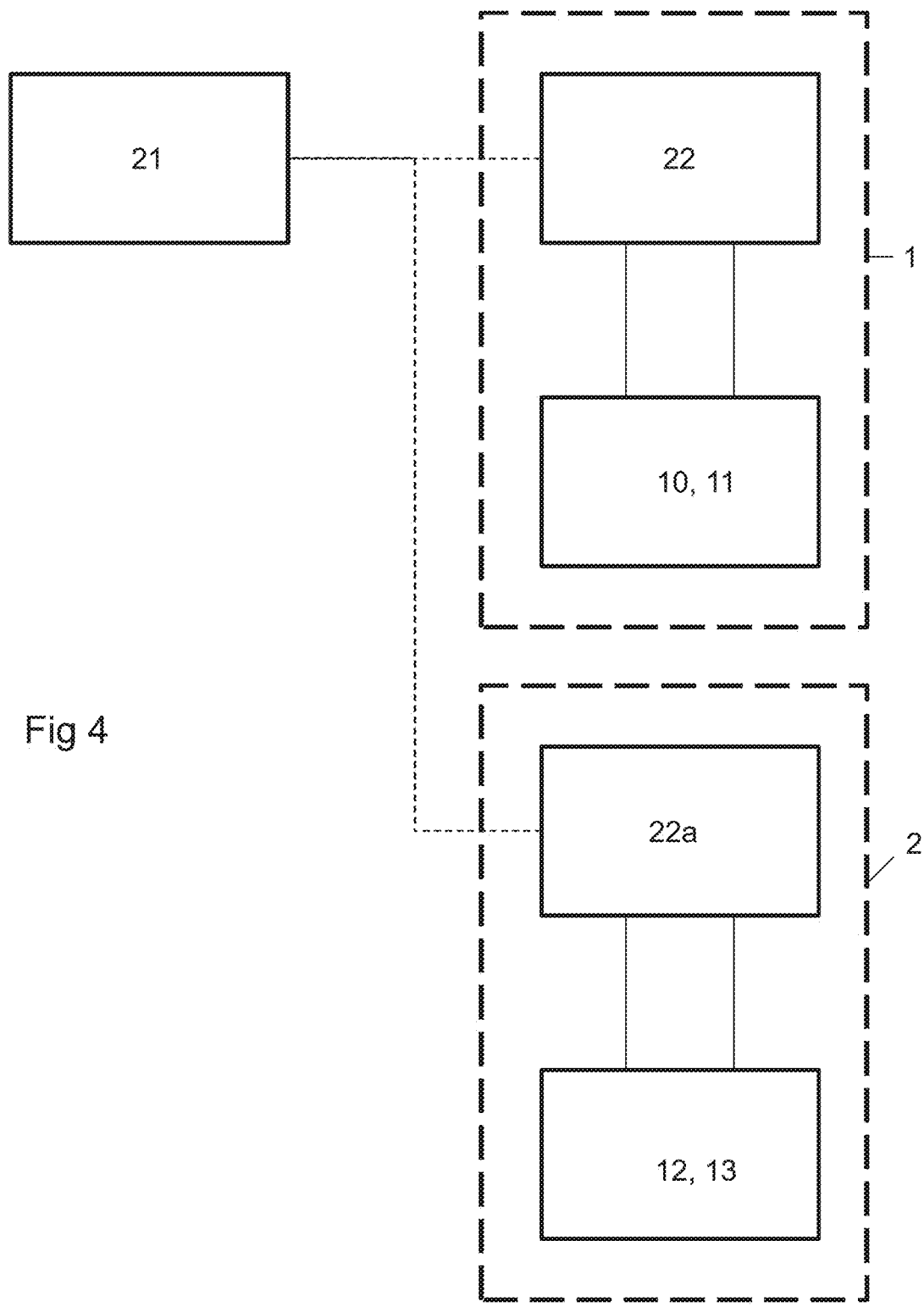
FIG. 4 shows a block diagram of the flow determination apparatus of FIG. 1.

In order to make a flow determination—typically to determine whether there is a leak from the plumbing network—a flow determination apparatus is used. This comprises multiple housings 1, 2 at different locations on the plumbing network, and a remote processor 21 (FIG. 4 of the accompanying drawings).

Figure 3:
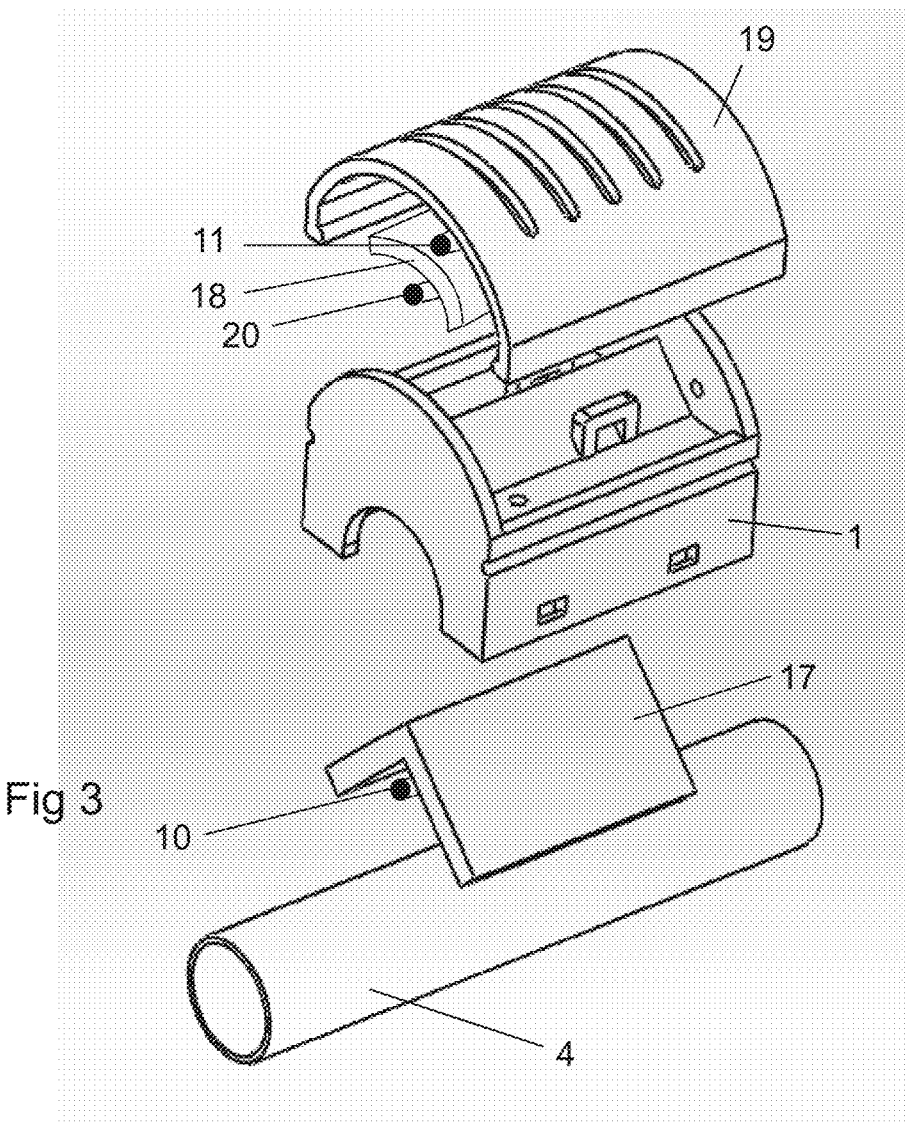
FIG. 3 shows an exploded perspective view of the housing of FIG. 2.

The housings 1, 2 are identical. A main housing 1 is provided on the main supply pipe 14, whereas an auxiliary housing 2 can be provided on each branch 15, 16. The housings 1, 2 are described in more detail using the example of the main housing 1 with reference to FIGS. 3 and 4.

In these Figures, it can be seen that the housing is provided as a body 1 which supports a first temperature sensor 10 against the pipe 4. It is held against the pipe 4 by means of a V-shaped aluminium block 17. The housing 1 is provided with thermally insulating foam 18 which separates a second temperature sensor 11 from the block. An optional third temperature sensor 20 can be provided between the insulating foam 18 and the block 17. A perforated lid 19 caps the housing 1 in order to allow ambient air to flow over the second temperature sensor 11.

The auxiliary housing is identical, but is provided with first 12, second 13 and optionally third (not shown) auxiliary temperature sensors respectively.

Each housing is also provided with a transmitter 22, 22a (FIG. 4)—such as a Bluetooth200 Low Energy transmitter—which can carry out some processing and transmits data to the remote processor 21. Each housing is also provided with a power source (not shown), such as a battery, to power the transmitter 22, 22a and the temperature sensors.

Figure 5:
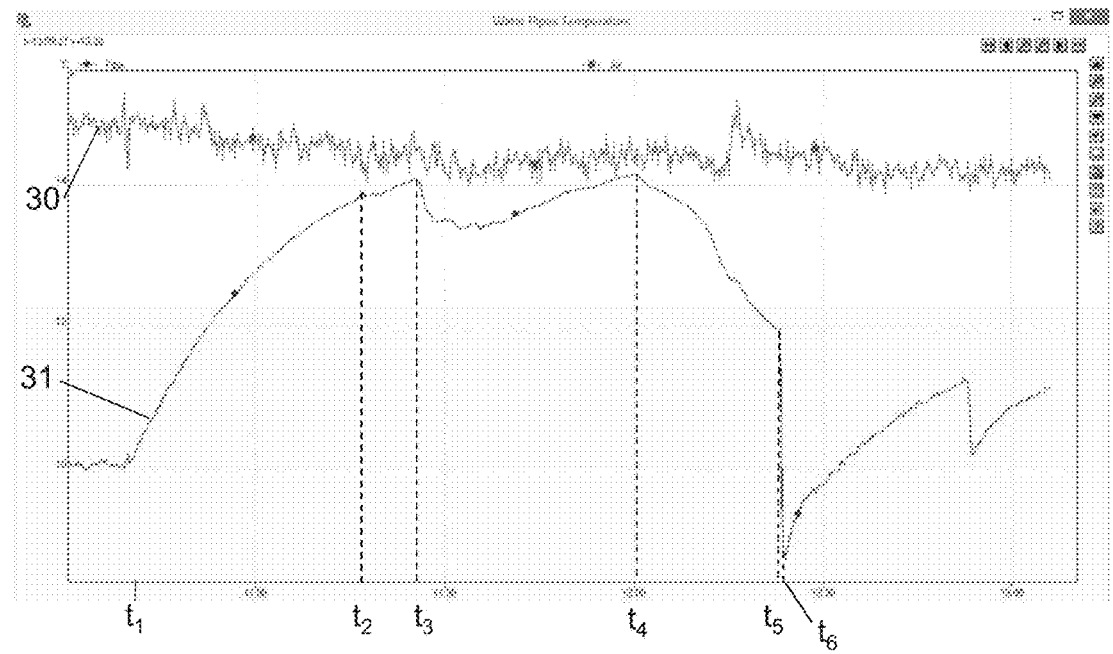
FIGS. 5 and 6 show graphs of data collected by the sensors of the flow determination apparatus of FIG. 1.
Figure 6:
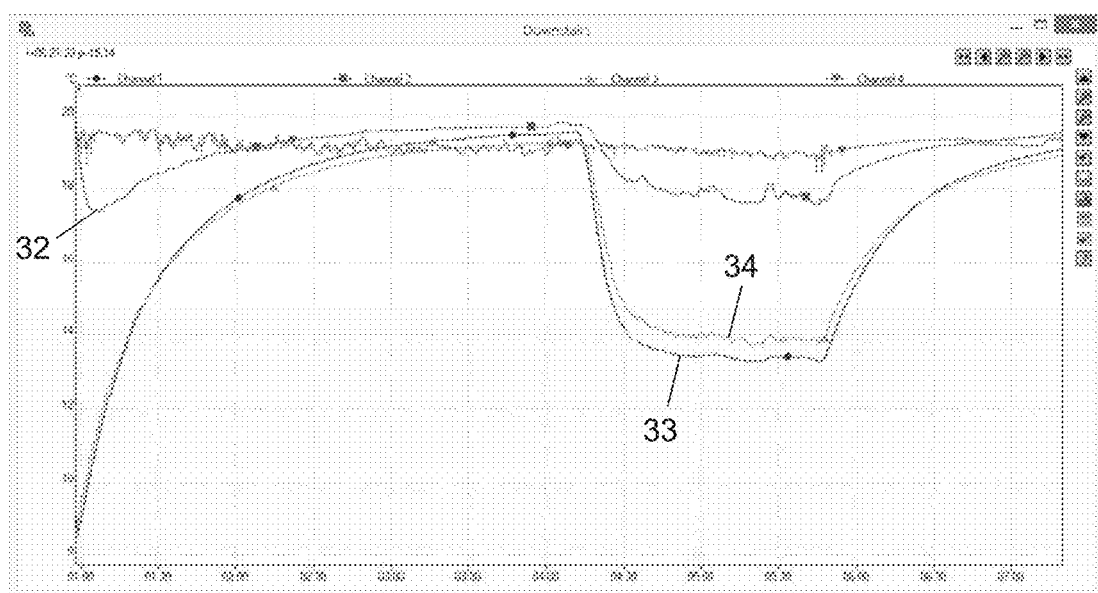

The data collected by the sensors shown in FIGS. 5 and 6 of the accompanying drawings can be used to demonstrate how a flow determination can be made with this apparatus.

The apparatus relies on the fact that, if there is no flow in the pipe 4, then the temperature of the pipe—sensed by the first temperature sensor 10 will converge with the ambient temperature—sensed by the second temperature sensor 11 following a predictable curve.

When there is a substantial flow, the temperature of the pipe 4 will typically diverge substantially from the ambient temperature. This is most notable in domestic plumbing networks the closer to the point of entry of the supply pipe 14 into the premises. This is because the temperature of the fluid flowing through the pipe 4—here, water—is likely to be different to the ambient temperature. In the domestic plumbing context, this is because pipes external to the dwelling are buried in the ground. In temperate climates such as the United Kingdom, it is likely that the water flowing into a dwelling will be significantly lower than ambient temperature and this explanation will be based on that assumption, although this embodiment will function well also with water significantly above ambient (for example, in an air-conditioned home in a hot climate).

This means that, in the example of a temperate climate, a substantial flow will lead to a sudden drop in temperature of the fluid flowing through the pipe 4 and so a drop in the temperature of the pipe 4 itself.

Where there is a low flow, the temperature of the fluid in the pipe 4 and so the pipe 4 itself will still move towards ambient temperature. We have appreciated that the curve with which the temperature moves towards the ambient temperature with time is different from that when there is no flow, and that this can be used to determine whether there is any flow and to estimate the level of that flow.

This can be demonstrated by considering FIG. 5 of the accompanying drawings. This shows measured data from a domestic dwelling, from the main housing 1. Trace 30 shows the ambient temperature as measured by the second temperature sensor 11 and trace 31 shows the pipe temperature as measured by the first temperature sensor 10, both plotted against time (shown in 24 hour clock).

In this example, at time $t_1$, the water through the dwelling was switched off; thus it was known that there was no flow. It can be seen that the trace 31 followed a particular curve between times $t_1$ and a later time $t_2$. This can be used to generate an expected convergence curve (or one can be calculated depending on the size and material of the pipe using standard fluid thermodynamic techniques). At time $t_3$ the water supply was restored to the dwelling and a small amount of divergence is seen as there is some flow to repressurise the plumbing system.

Subsequent to time $t_3$, it can be seen that there is some convergence with the ambient temperature 30. However, at time $t_4$, a toilet which had previously been disabled was reconnected, which had a leaking cistern. This had a leak of approximately 0.06 ml/second. This caused a substantial divergence from the ambient temperature until time $t_5$ when a tap was used, causing a substantial flow and a sudden divergence from the ambient temperature until time $t_6$.

At this point, the pipe temperature 31 begins to converge once more with the ambient temperature 30, but it can be seen that the convergence is slower than the curve between times $t_1$ and $t_2$. This is indicative of a small flow. In this example, the flow turned out to be another toilet that had a then undiagnosed leak.

As such, it can be seen that a binary determination of whether there is flow can be made based upon a determination of whether there is convergence at the expected convergence curve. An indication of the level of flow can be made by determining the difference between the actual and expected convergence; the larger the difference, the higher the flow.

In one particular embodiment, the rate of change of temperature of the pipe 4 is modelled. In this model, the change of temperature in one time interval—the time over which the algorithm is used—is given by:

$$\Delta T = \text{HeatGain}(T_{ambient} - T_{pipe}) - \text{FlowGain}(T_{pipe} - T_{supply})$$

where $T_{ambient}$ is the ambient temperature measured by the second temperature sensor 2, $T_{pipe}$ is the temperature of the pipe wall as measured by the first temperature sensor, $T_{supply}$ is the temperature of the water in the pipe at the supply (which can be determined as the lowest pipe wall temperature reached, as that is the temperature that the pipe wall will reach after sustained flow).

The values HeatGain and FlowGain are two proportionality constants; HeatGain will depend on the particular installation of the flow determination apparatus and so is unlikely to vary significantly over the timescales over which the measurements are taken. FlowGain, however, will depend on the level of flow through the pipe 4. However, an estimate of the level of the flow can be taken by modelling HeatGain and FlowGain as constant over a short period, and then attempting to fit the measured pipe wall temperature to the model given above by solving for HeatGain and FlowGain.

By then comparing the relative values of HeatGain and FlowGain, a measurement of the level of flow can be determined. If HeatGain is significantly larger than FlowGain (for example, if HeatGain is more than 50 times larger than FlowGain), then it is likely that there is no flow. If HeatGain is around 20 times larger than FlowGain, then convergence between the pipe and ambient temperatures can be expected to within 0.5 degrees. However, where this method is particularly useful is where a low level of flow is found; if HeatGain and FlowGain are roughly equal, then the pipe temperature will converge on a temperature which may be intermediate to the ambient and supply temperatures, which can indicate a small flow potentially indicative of a leak; we have found that this method can quickly determine such leaks.

As such, we can use a hierarchy of determinations:
Actual convergence of the pipe and ambient temperatures: no flow, no leak
Stable non-convergence of pipe and ambient temperatures (that is, convergence of the pipe temperature to a level intermediate to the supply and ambient temperatures): small flow indicative of a leak;
Convergence fits to curve: use model to see whether pipe and ambient temperatures will converge and determine flow status in accordance with that determination.

The confidence with which the convergence fits to a curve, or to which the HeatGain/FlowGain model fits the measured data, can be used as a confidence in the determination made.

Figure 7:
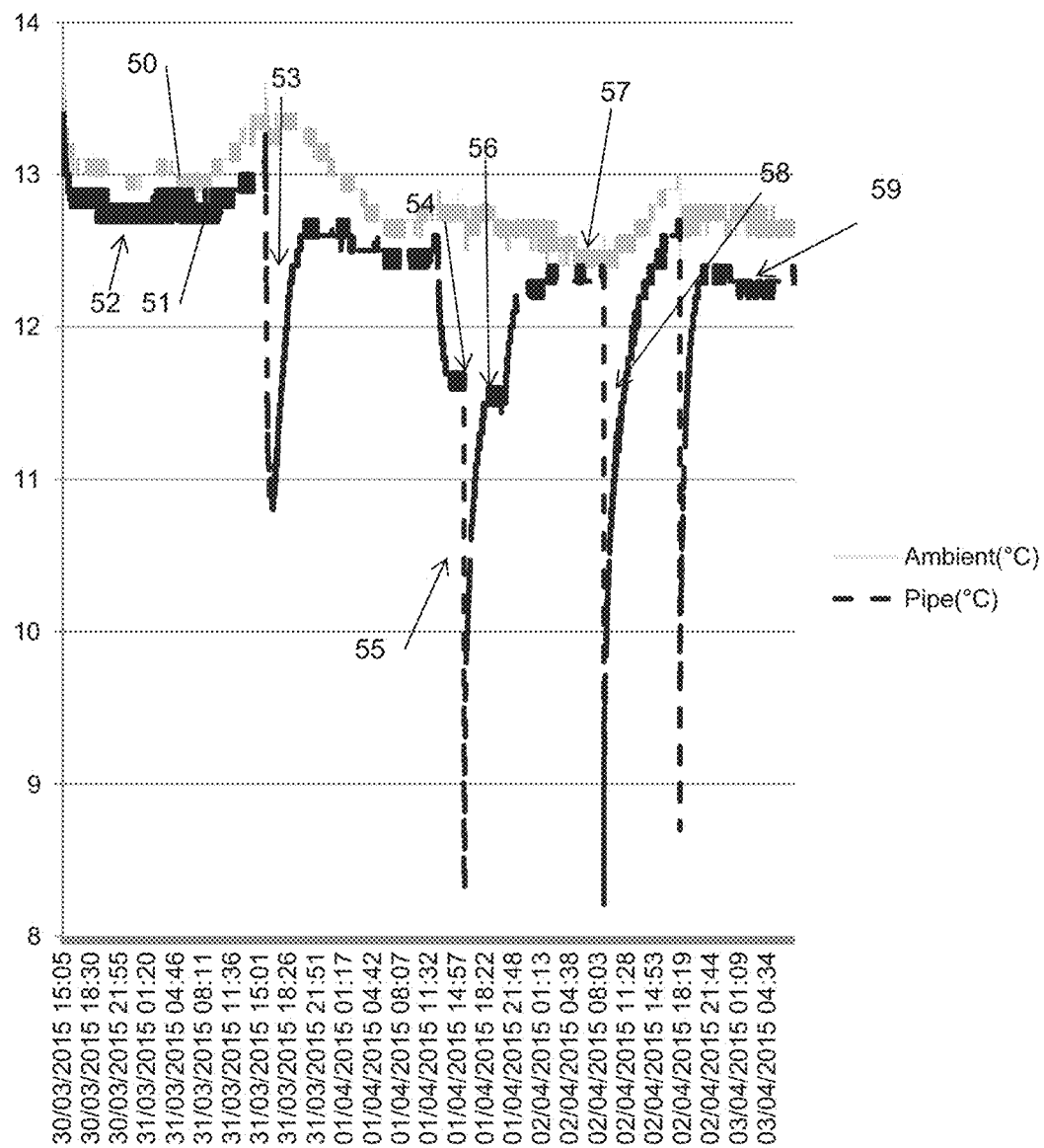
FIG. 7 shows another graph of data collected by the sensors of the flow determination apparatus of FIG. 1.

Data processed with this method can be seen in FIG. 7 of the accompanying drawings. In this figure, the ambient temperature is shown on trace 50, and the pipe temperature on trace 51. The data was collected in a domestic dwelling.

We can consider each of the time periods on the graph in turn:
Period 52: The water in the dwelling is turned off. No flow, and the two temperatures converge to within 0.5 degrees.
Period 53: The water in the dwelling is turned back on. Some flow occurs as the water system pressurises. However, the temperatures then converge.
Period 54: A tap is caused to start dripping. Whilst there is no convergence, the temperature difference becomes stable, and so the HeatGain method described above will function well.
Period 55: A large flow due to a toilet flushing.
Period 56: The dripping tap is still dripping, so after the toilet flush, the temperatures do not converge, but remain in the relationship they were in Period 54. As such, the HeatGain method will function well.
Period 57: The dripping tap is turned off; convergence occurs which implies no flow.
Period 58: Toilet is flushed twice to demonstrate major flow.
Period 59: A tap is turned back on again, and the temperatures stabilise without convergence, thus making the HeatGain method useful.

Data collected with the optional third temperature can be seen in FIG. 6 of the accompanying drawings. In this example, trace 32 shows the ambient temperature from the second temperature sensor 11, trace 33 shows the measurements made by the third temperature sensor 20 and trace 34 shows the measurements made by the first temperature sensor 10. Time is again measured using the 24 hour clock.

It can be seen that the effect of mounting the third temperature sensor above the aluminium block 17 is to smooth the measurement of the pipe temperature. Thus, it can be seen that between 04:30 and 05:45 the trace 34 is noisier than the trace 33. This noise can be used to indicate the presence of a small flow, without having to take sufficient measurements to measure the convergence. Thus, by comparing the first and third temperature measurements, and in particular the relative noisiness of the third temperature measurement, a further flow determination can be made. It may be possible to make such a flow determination quicker than waiting for convergence, although the accuracy and precision of such a measurement are likely to be less than the convergence technique.

In one embodiment, the standard deviation of the difference in temperature is taken over a period of time. If this exceeds a first limit—indicating that the data is noisy—then it is likely that a low level flow is occurring. If this exceeds a higher limit, then it is likely that there is a high flow indicative of usage.

Returning now to FIG. 1 of the accompanying drawings, it can be seen that an auxiliary housing 2 is provided in branch 16 with its own auxiliary temperature sensors 12, 13. In the same manner as above, these can be used to determine whether there is any flow (and the level of the flow) in the branch 16. Thus, if it is thought that there is a leak in the plumbing network, the auxiliary housings 2 (of which there could be many, one for each branch) can be used to determine which branch the leak is in.

The size of the divergence of the temperature of the water (and hence the pipe) on the one hand and the ambient temperature may be less when far into the plumbing network. As such, for the branches 16 deeper into the network, a heating/cooling apparatus 7 can be provided which selectively provides heating 9 or cooling 8 to the pipe 16 and hence the fluid, so as to increase the divergence in temperature when water flows. Typically, the heater 9 would be provided to heat the fluid, with smaller coolers 8 to cool preferentially the pipe 16 so that heat from the heater 9 does not propagate down the pipe rather than through the water.

The data collected may also be used to determine whether there is flow—typically a leak—upstream of the first temperature sensor 12, as is illustrated in FIG. 8 of the accompanying drawings. This graph shows the data collected by a first temperature sensor 12 at trace 60 and a second temperature sensor 13 at trace 61 for a particular installation over a five day period.

It can be seen that there is an upper limit on the first temperature 60—that is the temperature of the pipe. We have appreciated that an upstream leak causes a downstream temperature plume in the liquid such that the pipe temperature will not go above a certain point (assuming that the supply temperature is lower than ambient; if the opposite was true, than the limit would be a floor rather than a ceiling). This effect creates a plateau in periods of no downstream flow with an upstream leak. This can be seen at times 60a, where it can be seen that the first temperature 60 will not increase above an absolute (that is, not relative) limit regardless of what the ambient temperature 61 is doing.

Thus, by analysing the first temperature to determine the presence of a limit—for example, by looking for long periods of time (e.g. greater than an hour) where the first temperature is constant as the ambient temperature changes—the presence of an upstream flow can be determined.

A further embodiment of the sensing apparatus described above with reference to FIG. 1 of the accompanying drawings can be seen in FIGS. 9 to 15 of the accompanying drawings. Integers corresponding to those of the embodiment of FIG. 1 have been given corresponding reference numerals, raised by 100.

In this embodiment, a housing 101 is provided, but which, out of the temperature sensors, only houses second temperature sensor 120, which therefore senses the ambient temperature local to the housing 101. The housing 101 is coupled via a flexible cable 130 to the first temperature sensor 110, which is therefore distant from the second temperature sensor.

A sensor head 140 is also provided, shown in FIGS. 10 to 12 of the accompanying drawings. This has a through bore 151 into which the first temperature sensor 110 can be inserted, and a bayonet coupling 147 which can be engaged by a corresponding locking collar 148 of the first temperature sensor, so as to lock the first temperature sensor 110 into the sensor head 140.

The sensor head also comprises a pair of jaws 141, 142, comprising fixed jaw 140 and pivoting jaw 142. Pivoting jaw 142 is mounted on the sensor head 140 through a pivoting joint 143, so that the pivoting jaw can open and close relative to the fixed jaw 141. A pair of tension springs 144 are each mounted between mounting points 145 on the jaws 141, 142 to bias the jaws together.

The first temperature sensor 110, when installed in the sensor head 140 will protrude slightly from bore 151 so as to define a contact face 139 for the sensor head. Whilst the jaws extend generally away from the contact face 139, each jaw 141, 142 has a first surface 138 which slopes inwards towards the other jaw moving away from the contact face, and a second surface 137, which slopes away from the other jaw moving away from the contact face 139. The two surfaces 137, 138 on each jaw meet at a pinch point 136.

Thus, if the jaws are pressed over a pipe so that the widest part of the pipe passes the pinch points 136, then the springs 144 will act to squeeze the jaws 141, 142 together, and so the first surfaces will force the pipe into contact with the contact face. If the pipe is not pushed in sufficiently far so that the widest part does not pass the pinch points 136, then the biasing of the jaws 141, 142 by the springs 144 will cause the second surfaces to push the pipe away relative to the sensor head 140. Thus, an installer can be confident that the sensor head has been correctly pushed onto the pipe. The jaws are also shaped to have minimal thermal contact with the pipe. The sensor head 140 will also fall off the pipe at a lower force than is required to remove standard pipe clips, so that the sensor head is pulled off before the pipe is pulled off the wall or other surface on which it is mounted.

The first temperature sensor 110 is provided with a biasing spring 149, which biases it out of the bore 147, into contact with a pipe between the jaws 141, 142.

The contact face 139 is provided with a wider portion 160, which acts to distribute the forces caused by the housing 101 dangling from the sensor head 140 by means of the flexible cable 130 along the pipe. This means that, for vertical pipes, there is less moment exerted on the pipe.

Each jaw 141, 142 is provided with a groove 136, into which a tool can be inserted to force the jaws 141, 142 apart to allow for uninstallation of the sensor head 140.

Figure 13:
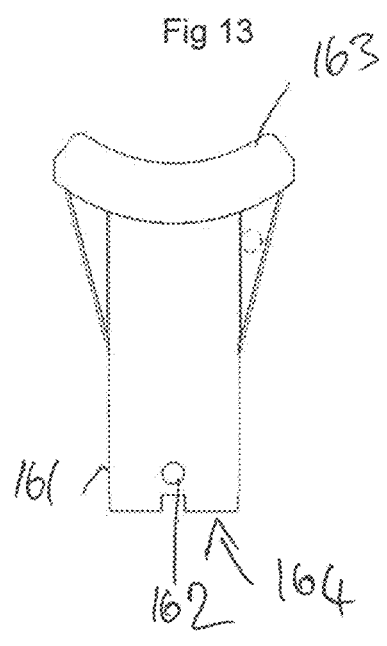
FIGS. 13 to 15 show front, side and perspective views respectively of an alternative sensor head of the sensing apparatus of FIG. 9.
Figure 14:
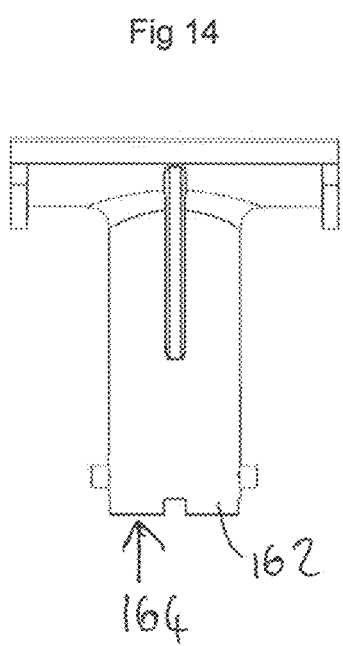
Figure 15:
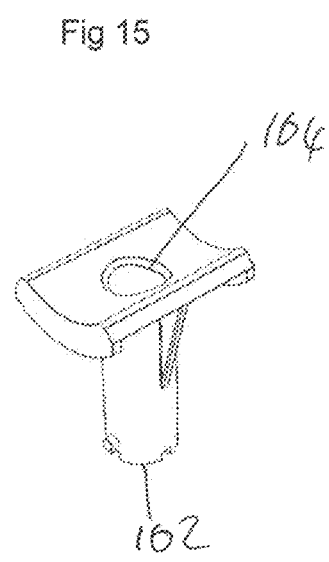

An alternative sensor head 161 is shown in FIGS. 13 to 15 of the accompanying drawings. This again has a through bore 164 for the first temperature sensor 110, provided with the same bayonet coupling 162 as for the sensor head 140 of FIGS. 10 to 12. However, rather than having jaws, it has a simple arcuate surface 163. This is useful for pipes that are larger than the jaws can fit, or which are irregularly shaped or otherwise inconvenient. The sensor head can then be attached to the pipe by means of adhesive tape, or by using tie wraps.

It can be seen that the installer of the sensor head can be provided with multiple different sensor heads, such as different sized versions of the sensor head 140 shown in FIGS. 10 to 12 as well as that of FIGS. 13 to 15. They can then choose which is most appropriate to the installation at hand, couple that to the first temperature sensor 110 and attach it to a pipe or other fluid conduit.

Other than as described above, this embodiment functions largely as that of FIG. 1. The flexible cable transmits, typically, the output of the first temperature sensor 110—a signal indicative of temperature—to the housing 101, which will house the transmitter 22 and possibly also a processor. By housing the second temperature sensor 120 distant from the pipe—allowing it to dangle from the pipe—temperature changes in the pipe will have less effect than if the housing were directly mounted on the pipe as in the embodiment of FIG. 1. Furthermore, there the sensor heads 140, 161 are smaller than the housings 1, 2 of the embodiment of FIG. 1 and are more convenient to install, with the bulky parts of the housing 101 being spaced from the potentially congested pipe area by the flexible cable 130.

Whilst in this embodiment the second temperature sensor 120 is shown in the housing 101, it could also be in the sensor head 140, 161; that would be closer to the first temperature sensor 110, but would mean that the thermal mass and the potential heating effects of the housing 101 containing the processor etc would have less effect on the measured second temperature (that is, ambient temperature).

Using multiple auxiliary temperature sensors 12, 13 as shown in FIG. 1 in a single building allows the formulation of a situational profile of water movement through the building. Measurements can be taken from feed pipes to header tanks, exit pipes from header tanks, in building pipework locations (branch points) through to end point usages e.g. toilet cistern or a tap. The collation of the data allows:

1. A thermal profile of how water travels through the building showing points of thermal loss to the liquid as well as thermal gain to the liquid.
2. What water flows through which tanks and when—a hydraulic profile as shown in FIG. 16 of the accompanying drawings. In this figure, traces of the pipe temperature leading from three different tanks is shown over a time period of four days; the top trace is only used roughly a third of the way through the trace (where there is a sudden drop in temperature), whereas for the other two tanks, significant drops and so flows occur roughly halfway and two thirds of the way through the traces;
3. What water flows through which branches and when— hydraulic profile
4. Identification of dead ends or low usage points
5. *Legionella* risk points due to no flow or thermal variances
6. Areas of leakage—specific network branches
7. Identification of user patterns—e.g. which toilets get used most often and therefore need more maintenance and or cleaning—as shown in FIG. 17 of the accompany drawings, in which the usage for each of the locations listed on the right hand side of the graph are shown in that order for each day (DHW being domestic hot water).

The remote processor 21 may be that of a mobile telephone, such as an iPhone® sold by Apple Inc, or a dedicated device such as a hub receiving signals from several housings. The processing of the temperature signals to produce a flow determination can be carried out in a processor in the housing—typically that of the transmitter 22, 22a—so that the transmitter transmits only the flow indication (typically as events such as differing levels of flow). Alternatively, the transmitter 22, 22a can transmit the temperature signals to the remote processor 21 which can then make the flow determination.

The functions described above can be implemented in an application (an "app"), communicating with any number of housings 1, 2, typically in one plumbing network. Alerts can be configured to notify a user should there be a flow above a threshold for a given period (indicative of a small persistent leak) or if there is significant flow at an unexpected time (for example, a substantial flow in the middle of the night or when the occupants are on holiday).

An alternative embodiment of a data collection system is shown in FIG. 18 of the accompanying drawings. In this system, there are a plurality of locations 200 such as individual houses. Each location has one or more data capture devices 201, which would typically be the housings 1, 2 discussed above. Each of these data capture devices will capture data (here, either temperatures or flow determinations) and store the data until it can be transmitted on as discussed below. Each data capture device 201 will comprise a transmitter, which will use a relatively short range transmission protocol such as Bluetooth, wifi or Zigbee, which can be received in a reception area 202 for each data capture device.

The system will comprise a plurality of mobile telecommunications devices 203, such as mobile telephones running a suitable application stored in a memory and run on a processor. Each mobile telecommunications device will have a receiver for the relatively short range transmission protocol, and a transceiver for a mobile telecommunications network (such as GPRS® or 3GPP®). When each mobile telecommunications device 203 passes into a reception area 202, it will receive the data that has been captured by the relevant data capture devices 201. It will then pass that data over the mobile telecommunications network to a central server 204.

Typically, each of the mobile telecommunications devices 203 will be associated with at least one data capture device 201, and typically all of the data capture devices at a given location 200 (say, the user's home). The mobile telecommunications devices 203 will receive data and transmit it to the central server 204 regardless of whether it is associated with the relevant data capture devices. However, each mobile telecommunications device 203 will only allow the user access to data from data capture devices 201 with which it is associated.

The central server 204 will then typically transmit the data from each data capture device 201 back to the mobile telecommunications device 203 with which the data capture device 201 is associated. This may not be necessary if the central server 204 received the data from the mobile telecommunications device 203 with which the data capture device 201 was associated; indeed, in such a case the mobile telecommunications does not necessarily need to transmit that data to the central server 204.

Accordingly, any mobile telecommunications device 204 passing the locations 200 through the reception areas 202 can cause the data to be uploaded to the central server, so that a user can then access it. This is helpful where the data is the temperature or flow data discussed above, as that means that a user may be able to receive information about flows in the pipework of their house when they are absent, if a third party running the application on their mobile telecommunications device has happened, serendipitously or otherwise, to pass through the reception area 202. In effect, the data collection has been crowd sourced.

As such, we have found the apparatus discussed above with respect to the various embodiments can provide an indication that there is a flow down to 0.2 litres per hour (0.06 ml/second). It is not invasive, in that no penetration of the pipe or measurement equipment inside the pipe is required. It requires only very simple components—the temperature sensors can be thermistors, for example. Overall, it provides a cheap and flexible way to make a flow determination.

The data generated by this embodiment can be used in multiple situations. Examples include leak detection, the monitoring of particularly domestic water usage patterns or even ensuring temperature and flow rates are sufficient to avoid legionella proliferation.

The invention claimed is:

1. An apparatus for making a flow determination with respect to a flow through a fluid conduit, the fluid conduit comprising a wall having an inner surface surrounding a flow space through which a fluid flows and an outer surface, the apparatus comprising:
   a first temperature sensor arranged to be mounted on the outer surface of the fluid conduit and arranged to generate a first temperature signal indicative of a first temperature being a temperature of the outer surface;
   a second temperature sensor arranged to be positioned spaced apart from the first temperature sensor and to generate a second temperature signal indicative of a second temperature being an ambient temperature outside of the fluid conduit;
   a processor having inputs for the first and second temperature signals;
   in which the processor has an output for the flow determination and is arranged to make the flow determination by determining a measure of the convergence of the first and second temperatures over time; and
   a third temperature sensor arranged to output a third temperature signal indicative of the first temperature but which is less responsive temporally than the first temperature sensor.

2. The apparatus of claim 1, comprising a housing in which the first and/or second temperature sensors are mounted, the housing supporting the first temperature sensor against the fluid conduit and optionally supports the second temperature sensor spaced away from the first temperature sensor.

3. The apparatus of claim 2, in which the housing comprises a thermal mass which holds the first temperature sensor against the fluid conduit.

4. The apparatus of claim 3, in which the third temperature sensor is provided on the thermal mass on an opposite face of the thermal mass to the first temperature sensor.

5. The apparatus of claim 2, in which the housing is provided with thermal insulation which separates the first temperature sensor from the second temperature sensor.

6. The apparatus of claim 1, comprising a transmitting unit which is arranged to transmit at least one of the first and second temperature signals or the flow determination to a remote location.

7. The apparatus of claim 1, provided with at least one auxiliary set of sensors each comprising:
   a first auxiliary temperature sensor arranged to be mounted on the outer surface of the fluid conduit at a different location to the first temperature sensor and arranged to generate a first auxiliary temperature signal indicative of a first auxiliary temperature being the temperature of the outer surface at the different location;
   a second auxiliary temperature sensor arranged to be positioned spaced apart from the first auxiliary temperature sensor and to generate a second auxiliary temperature signal indicative of a second auxiliary temperature being the ambient temperature outside of the fluid conduit at the different location;
   in which the processor has inputs for each of the first and second auxiliary temperature sensors.

8. The apparatus of claim 7, comprising a temperature differential establishing device, arranged to be placed upstream of one of the first and second temperature sensors, and arranged to impart a temperature differential to the fluid flowing through the fluid conduit.

9. The apparatus of claim 1, further comprising:
   a sensor head housing the first temperature sensor, the sensor head being arranged so as to hold the first temperature sensor against the fluid conduit; and
   a housing, wherein the housing and the sensor head are joined by a flexible cable for transmitting at least one of the first and second temperature signals.

10. A kit of parts comprising:
    the apparatus of claim 1;
    a plurality of sensor heads arranged to house the first temperature sensor, each sensor head being arranged so as to hold the first temperature sensor against the fluid conduit; and
    a housing, wherein:
       the second temperature sensor is positioned in the housing; and
       the second temperature corresponds to the ambient temperature around the housing;
    wherein:
       the housing and the sensor head are joined by a flexible cable for transmitting at least one of the first and second temperature signals; and
       the plurality of sensor heads can interchangeably engage the first temperature sensor.

11. A fluid conduit fitted with an apparatus for making a flow determination with respect to a flow through the fluid conduit, the fluid conduit comprising a wall having an inner surface surrounding a flow space through which a fluid flows and an outer surface, the apparatus comprising:
    a first temperature sensor arranged to be mounted on the outer surface of the fluid conduit and arranged to generate a first temperature signal indicative of a first temperature being a temperature of the outer surface;
    a second temperature sensor arranged to be positioned spaced apart from the first temperature sensor and to generate a second temperature signal indicative of a second temperature being an ambient temperature outside of the fluid conduit;
    a processor having inputs for the first and second temperature signals;
    in which the processor has an output for the flow determination and is arranged to make the flow determination by determining a measure of the convergence of the first and second temperatures over time; and
    a third temperature sensor arranged to output a third temperature signal indicative of the first temperature but which is less responsive temporally than the first temperature sensor.

12. A method of making a flow determination with respect to a flow through a fluid conduit, the fluid conduit comprising a wall having an inner surface surrounding a flow space through which the fluid flows and an outer surface, the method comprising:
    measuring a first temperature corresponding to a temperature of the outer surface of the fluid conduit with a first temperature sensor mounted on the surface and generating a first temperature signal according to the measured first temperature;
    measuring a second temperature corresponding to an ambient temperature outside of the fluid conduit with a second temperature sensor spaced apart from the first temperature sensor and generating a second temperature signal according to the measured ambient temperature;
    making the flow determination with a processor having inputs for the first and second temperature signals by determining a measure of the convergence of the first and second temperatures over time; and
    measuring a third temperature with a third temperature sensor which is less responsive temporally than the first temperature sensor and generating a third temperature signal indicative of the first temperature.

13. The method of claim 12, in which the determination of the measure of convergence comprises the comparison of the convergence with time of the first and second temperatures with an expected convergence curve.

14. The method of claim 13, in which the expected convergence curve expresses the expected convergence of the first and second temperatures with time with no flow in the fluid conduit.

15. The method of claim 12, in which the determination of the measure of convergence comprises modelling the rate of change of the first temperature with time, the rate of change of the first temperature comprising a first component which is proportional to the difference between the first and second temperatures and has a first proportionality constant, and a second component which is proportional to the difference between the first temperature and a fluid temperature, being the temperature of a fluid in the fluid conduit, and has a second proportionality constant.

16. The method of claim 12, comprising making a flow determination of a flow upstream of the first temperature sensor by determining the presence of a limit in the first temperature.

17. The method of claim 12, in which the determination of the measure of convergence comprises the comparison of a degree at which the first and second temperatures are converging with an expected degree, which expresses an expected degree of convergence with no flow in the fluid conduit.

18. An apparatus for making a flow determination with respect to a flow through a fluid conduit, the fluid conduit comprising a wall having an inner surface surrounding a flow space through which the fluid flows and an outer surface, the apparatus comprising:
- a first temperature sensor arranged to be mounted on the outer surface of the fluid conduit and arranged to generate a first temperature signal indicative of a first temperature being the temperature of the outer surface;
- a second temperature sensor arranged to be positioned spaced apart from the first temperature sensor and to generate a second temperature signal indicative of a second temperature being the ambient temperature outside of the fluid conduit; and
- a processor having inputs for the first and second temperature signals;
- in which the processor has an output for the flow determination and is arranged to make the flow determination based on the rate of change of the first temperature with time;
- wherein the processor is arranged to make the flow determination by a process comprising:
  - modelling the rate of change of the first temperature with time;
  - using the modelled rate of change to determine whether the first and second temperatures will converge; and
  - determining a flow status in accordance with that determination.

19. An apparatus according to claim 18, wherein the processor is arranged to use the rate of change of the first temperature with time to determine a measure of convergence of the first and second temperatures over time.

20. The apparatus of claim 19, in which the modelled rate of change of the first temperature comprises a first component which is proportional to the difference between the first and second temperatures and has a first proportionality constant, and a second component which is proportional to the difference between the first temperature and a fluid temperature, being the temperature of a fluid in the fluid conduit, and has a second proportionality constant.

21. The apparatus of claim 18 comprising a third temperature sensor arranged to output a third temperature signal indicative of the first temperature but which is less responsive temporally than the first temperature sensor.

22. The apparatus of claim 18, provided with at least one auxiliary set of sensors each comprising:
- a first auxiliary temperature sensor arranged to be mounted on the outer surface of the fluid conduit at a different location to the first temperature sensor and arranged to generate a first auxiliary temperature signal indicative of a first auxiliary temperature being the temperature of the outer surface at the different location; and
- a second auxiliary temperature sensor arranged to be positioned spaced apart from the first auxiliary temperature sensor and to generate a second auxiliary temperature signal indicative of a second auxiliary temperature being the ambient temperature outside of the fluid conduit at the different location, in which the processor has inputs for each of the first and second auxiliary temperature sensors.

23. The apparatus of claim 22, comprising a temperature differential establishing device, arranged to be placed upstream of one of the first and second temperature sensors, and arranged to impart a temperature differential to the fluid flowing through the fluid conduit.

24. The apparatus of claim 18, further comprising:
- a sensor head housing the first temperature sensor, the sensor head being arranged so as to hold the first temperature sensor against the fluid conduit; and
- a housing, wherein the housing and the sensor head are joined by a flexible cable for transmitting at least one of the first and second temperature signals.

* * * * *